(12) United States Patent
Pillhoefer et al.

(10) Patent No.: US 9,890,642 B2
(45) Date of Patent: Feb. 13, 2018

(54) ALUMINIDE OR CHROMIDE COATINGS OF CAVITIES

(71) Applicant: MTU AERO ENGINES GMBH, Munich (DE)

(72) Inventors: Horst Pillhoefer, Roehrmoos (DE); Max Morant, Aschau (DE); Stefan Mueller, Munich (DE); Anja Kliewe, Fuerstenfeldbruck (DE)

(73) Assignee: MTU AERO ENGINES GMBH, Munich (DE)

( * ) Notice: Subject to any disclaimer, the term of this patent is extended or adjusted under 35 U.S.C. 154(b) by 1013 days.

(21) Appl. No.: 13/853,306

(22) Filed: Mar. 29, 2013

(65) Prior Publication Data

US 2013/0259690 A1 Oct. 3, 2013

(30) Foreign Application Priority Data

Apr. 3, 2012 (DE) .......................... 10 2012 006 654

(51) Int. Cl.
*F01D 5/14* (2006.01)
*F23C 10/02* (2006.01)
(Continued)

(52) U.S. Cl.
CPC .............. *F01D 5/147* (2013.01); *C23C 10/02* (2013.01); *C23C 10/36* (2013.01); *C23C 10/38* (2013.01); *C23C 10/60* (2013.01); *C23C 24/087* (2013.01); *F01D 5/18* (2013.01); *F05D 2230/30* (2013.01); *F05D 2260/95* (2013.01); *F05D 2300/121* (2013.01); *F05D 2300/132* (2013.01); *F05D 2300/611* (2013.01); *Y02T 50/676* (2013.01); *Y10T 428/13* (2015.01)

(58) Field of Classification Search
CPC ......... C23C 10/02; C23C 10/06; C23C 10/10; C23C 10/34; C23C 10/60; C23C 2/02; C23C 2/265; C23C 2/28; C23C 28/32; C23C 28/324; F01D 5/147; F01D 5/18; F05D 2230/30; F05D 2260/95; F05D 2300/121; F05D 2300/132; F05D 2300/611; Y02T 50/676; Y10T 428/13
USPC .................. 415/116; 427/201, 140, 229, 256
See application file for complete search history.

(56) References Cited

U.S. PATENT DOCUMENTS

| 3,753,758 A | 8/1973 | Shanley |
| 4,537,927 A | 8/1985 | Baldi |

(Continued)

FOREIGN PATENT DOCUMENTS

| DE | 10331351 A1 | 1/2005 |
| DE | 60216177 T2 | 9/2007 |

(Continued)

*Primary Examiner* — Mark Laurenzi
*Assistant Examiner* — Dapinder Singh
(74) *Attorney, Agent, or Firm* — Abel Law Group, LLP

(57) ABSTRACT

Disclosed is a process for producing an alloyed, in particular multiple-alloyed aluminide or chromide layer on a component by alitizing or chromizing. First a green compact layer (9) consisting of a binder (5) and metal particles (7) is deposited on the component (1) to be coated and then alitizing or chromizing is carried out, binder and metal particles being deposited on the component separately from one another, first the binder and then the metal particles. A turbine component produced by this process is also disclosed.

20 Claims, 2 Drawing Sheets

(51) Int. Cl.
*F01D 5/18* (2006.01)
*C23C 10/02* (2006.01)
*C23C 10/60* (2006.01)
*C23C 10/36* (2006.01)
*C23C 10/38* (2006.01)
*C23C 24/08* (2006.01)

(56) References Cited

U.S. PATENT DOCUMENTS

| | | |
|---|---|---|
| 6,461,107 B1 | 10/2002 | Lee et al. |
| 6,497,920 B1 | 12/2002 | Pfaendtner et al. |
| 7,390,534 B2 | 6/2008 | Park et al. |
| 2002/0141869 A1 | 10/2002 | Lee et al. |
| 2005/0095358 A1 | 5/2005 | Park et al. |
| 2005/0265882 A1 | 12/2005 | Naumann et al. |
| 2007/0036897 A1 | 2/2007 | Linska et al. |
| 2007/0141385 A1* | 6/2007 | Rucker .................. C23C 10/18 428/680 |
| 2009/0126833 A1 | 5/2009 | Cavanaugh et al. |
| 2009/0162209 A1* | 6/2009 | Wortman ................ F01D 5/187 416/241 R |
| 2009/0324841 A1* | 12/2009 | Arrell ...................... C23C 4/02 427/446 |

FOREIGN PATENT DOCUMENTS

| | | |
|---|---|---|
| DE | 60132740 T2 | 2/2009 |
| DE | 602004012039 T2 | 2/2009 |
| DE | 602004000465 T2 | 6/2010 |
| DE | 10 2009 008 510 A1 | 8/2010 |
| EP | 1528117 A1 | 5/2005 |
| EP | 2060653 A2 | 5/2009 |

* cited by examiner

ALUMINIDE OR CHROMIDE COATINGS OF CAVITIES

CROSS-REFERENCE TO RELATED APPLICATIONS

The present application claims priority under 35 U.S.C. § 119 of German Patent Application No. 10 2012 006 654.6, filed Apr. 3, 2012, the entire disclosure of which is expressly incorporated by reference herein.

BACKGROUND OF THE INVENTION

1. Field of the Invention

The present invention relates to the production of alloyed, in particular multiple-alloyed aluminide or chromide layers on a component by means of alitizing or chromizing and also in particular to components produced thereby, in particular turbine components of a gas turbine, in particular of an aero engine.

2. Discussion of Background Information

Components in gas turbine engines, which are exposed to high temperatures and chemically aggressive surroundings, are adapted by coating or surface treatment in such a manner that they can withstand the corresponding surroundings. For this purpose, it is known, for example, to produce diffusion coatings in the form of aluminide layers or chromide layers. Various processes are available for this, as described for example in DE 602004012039 T2 and EP 1 528 117 B1, the entire disclosures of which are incorporated by reference herein.

In the production of such aluminide or chromide layers, it is possible to incorporate alloying constituents into the aluminide or chromide layer if the corresponding alloying constituents are deposited on the surface of the component to be processed in the form of metal particles before the alitizing or chromizing. For this purpose, what are termed green compact layers are deposited on the components to be treated, these green compact layers containing the metal components which are to be incorporated into a corresponding aluminide or chromide layer. This is made possible, for example, by spraying on mixtures of binders and powders. During the subsequent alitizing or chromizing, the binder is driven out or serves as an activator, as described in DE 60 2004 012 039 T2, the entire disclosure of which is incorporated by reference herein, and the metal components are incorporated into the aluminide or chromide layer.

Such a process is problematic for interior spaces of hollow turbine blades or vanes, however, since a corresponding application of the green compact layer by means of spraying is not possible, in particular on account of undercuts or a lack of direct access to the interior spaces or cavities.

SUMMARY OF THE INVENTION

It is an object of the present invention to provide a process with which alloyed, in particular multiple-alloyed aluminide and chromide layers can also be deposited in cavities of components, in particular turbine components, preferably turbine blades or vanes, in a defined manner, in particular with a uniform layer thickness.

The present invention provides a process for producing at least one alloyed aluminide and/or chromide layer on a component by alitizing and/or chromizing. The process comprises depositing a green compact layer of a binder and metal particles on the component to be coated and thereafter carrying out alitizing and/or chromizing. The binder and the metal particles are deposited on the component separately from one another by first applying the binder to form a binder layer, and then depositing the metal particles on or in the binder layer.

In one aspect of the process, more than one alloyed aluminide and/or chromide layer may be produced on the component.

In another aspect of the process the binder may be applied to the component by dip coating and then the metal particles may be applied by dusting or embedding the component in a powder bed of the metal particles to be deposited.

In yet another aspect, the step of applying binder and depositing metal particles may be repeated two or more (several) times.

In another aspect, the green compact layer may be subjected to a heat treatment after the last metal particles have been applied, or after each step or after two or more (several) steps of applying binder and depositing metal particles.

In another aspect of the process of the present invention, the component may comprise a cavity and/or an undercut. For example, the binder may be applied by introducing the binder into a cavity and the metal particles may be deposited by introducing a powder of the metal particles to be deposited into the cavity.

In a still further aspect, the deposited green compact layer may have a thickness of from 10 μm to 150 μm and/or the step of applying binder and depositing metal particles may be repeated two or more (several) times to produce two or more sublayers, each sublayer having a thickness of from 3 μm to 5 μm.

In another aspect, a graduated green compact layer may be deposited.

In another aspect of the process, the metal particles may comprise two or more types of particles which differ from each other in terms of the chemical composition thereof In another aspect, the component may be a turbine component for a gas turbine, e.g., a turbine component for an aero engine and in particular, a turbine blade or vane.

The present invention also provides a turbine component that comprises at least one cavity. At least one alloyed aluminide and/or chromide layer is formed on the surface of the turbine component in the cavity.

In one aspect of the turbine component, the turbine component may be a turbine blade or vane which may, for example, comprises one or more cooling passages or the like.

In another aspect, the at least one aluminide or chromide layer may have a uniform layer thickness.

BRIEF DESCRIPTION OF THE DRAWINGS

The accompanying drawings purely schematically show in

DETAILED DESCRIPTION OF THE PRESENT INVENTION

Figure 1:
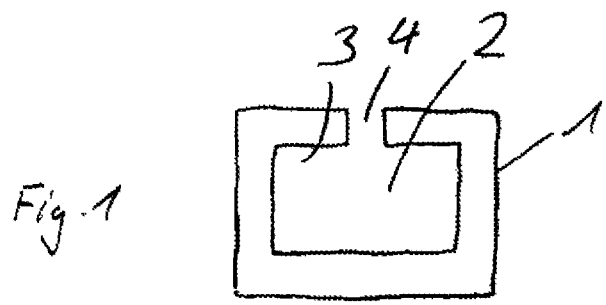
FIG. 1 a sectional view through a component which is treated according to the invention.

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show details of the present invention in more detail than is necessary for the fundamental understanding of the present invention, the description in combination with the drawings making apparent to those of skill in the art how the several forms of the present invention may be embodied in practice.

The present invention is based on the concept that a so-called green compact layer of a binder and metal particles can be applied as a basis for subsequent alitizing or chromizing in cavities in a defined manner by separating the deposition of binder and metal particles. Accordingly, according to the invention, firstly the binder is applied to the component to be treated and then the metal particles are deposited on or in the binder layer.

This makes it possible in particular to uniformly alitize or chromize cavities of components, where one or more alloying components can be incorporated in the thus produced aluminide or chromide layer at the same time.

In particular, in a first step the binder can be applied to the component by dip coating and in a second step the metal particles can be applied by dusting with corresponding metal powder or embedding the component in a powder bed of the metal particles to be deposited.

For the coating or surface treatment of cavities or the surfaces thereof, the dip coating can be effected in such a way that the cavity is filled by the low-viscosity binder, and once all the surface regions of the cavity have been wetted with the binder, the binder is removed from the cavity again. Metal particles can then be deposited on the binder layer thus deposited on the cavity surface and can be introduced into the cavity likewise by introducing metal powder, in particular fine-grained metal powder. After the powder has been removed from the cavity, the metal particles of the powder which adhere to the binder layer remain on the surface of the cavity and thus form a corresponding green compact layer.

The corresponding steps of depositing a binder layer and applying metal particles can be repeated until the required layer thickness has been reached.

By way of example, the thickness of the green compact layer can be 10 to 150 micrometers (μm), where the sublayers of the partially deposited green compact layers can have a layer thickness in the range of three to five micrometers, corresponding to the particle size of the metal particles to be applied.

The metal powder used can comprise different metal particles, and therefore a plurality of alloying components can be incorporated into the green compact layer. In addition, different metal powders can be used in the substeps, and therefore a graduated green compact layer and thus also a graduated aluminide or chromide layer can be produced.

The green compact layer can be subjected to a heat treatment after each substep with the deposition of a binder layer and application of the metal particles, after a plurality of such substeps or after completion of the green compact layer, in order for example to dry the binder and/or drive it out in part or completely and to cake the metal particles together in a porous entity.

The subsequent alitizing or chromizing can be carried out by known processes, with a corresponding aluminide or chromide layer being formed by the diffusion of the aluminum or chromium into the green compact layer and the surface of the component to be treated.

EXAMPLE

Further advantages, characteristics and features of the present invention will become clear from the following detailed description of an exemplary embodiment.

FIG. 1 shows a component 1 which is to be treated according to the present invention. The component is shown merely in schematic form and it is self-evident that actual components can be used in the widest variety of forms and designs.

The component 1 is particularly suitable for the process according to the invention since the component 1 has a cavity 2 which is to be coated or is to be subjected to a surface treatment, although the opening 4 which would allow access to the cavity 2 is so small or is arranged disadvantageously in a manner such that coating or a surface treatment of the cavity 2 is difficult to even impossible. Particularly in regions of undercuts 3 which are not accessible directly through the opening 4 in the cavity, coating or surface treatment processes in which, for example, a direct actual and precise connection with the treatment tool is required by spraying or the like cannot be carried out by known processes.

Figure 2:
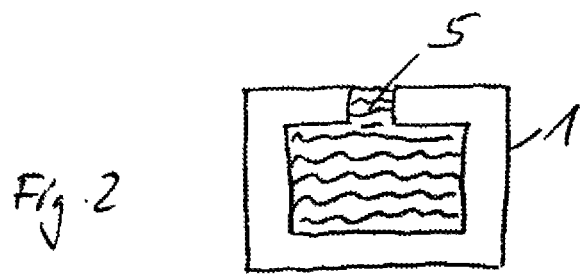
FIG. 2 the component shown in FIG. 1 with a binder introduced into a cavity.

According to the process according to the invention, a binder 5 is introduced into the cavity 2 of the component 1, such that the entire surface of the cavity 2 is wetted with the binder 5 in the manner of a dip coating. This is shown in FIG. 2.

Figure 3:
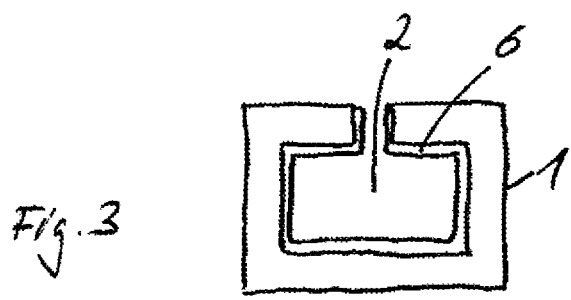
FIG. 3 the component shown in FIG. 1 and FIG. 2 with a deposited binder layer.

After the cavity 2 has been emptied (see FIG. 3), a binder film 6 remains on the surface of the cavity 2, since the binder 5 remains adhering to the surface of the component 1.

Figure 4:
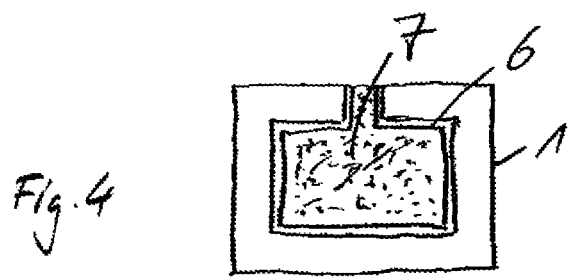
FIG. 4 the component shown in FIGS. 1 to 3 with metal powder introduced.
Figure 5:
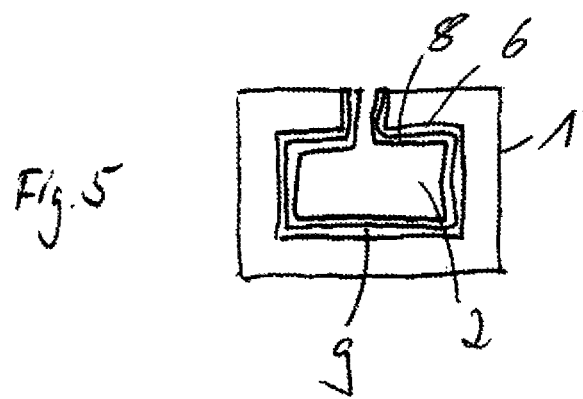
FIG. 5 the component shown in FIGS. 1 to 4 with a deposited green compact layer; and in FIG. 6 a view of the component 1 shown in FIGS. 1 to 5 in a reaction chamber for the alitizing or chromizing.
Figure 6:
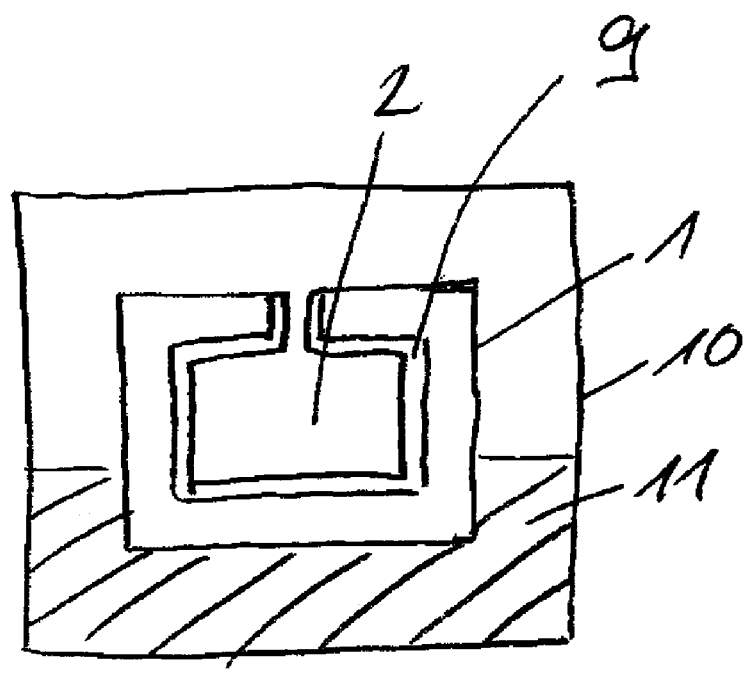

In the next process step, which is shown in FIG. 4, the thus prepared component 1 is then exposed to metal particles. The metal particles are present in the form of a metal powder 7, which is introduced in turn into the cavity 2 (see FIG. 4). The metal particles of the metal powder 7 can correspondingly be incorporated into the binder layer 6 and/or adhere thereto. After the cavity 2 has been emptied, a green compact layer 9 remains, consisting either of two sublayers, specifically the binder layer 6 and the metal particle layer 8, or of a layer comprising a binder matrix, into which metal particles are incorporated. It goes without saying that combinations of the corresponding layer formations are also possible.

The process steps according to FIGS. 2 to 5 can be repeated until the green compact layer 9 has the desired structure in terms of the composition and/or the layer thickness.

As soon as the green compact layer 9 is finished, i.e. once the last powder particles have been applied, the component 1 can be subjected to alitizing or chromizing in a process chamber 10. To this end, appropriate alitizing or chromizing powder 11 can be provided and, together with the atmosphere which can be established in the process chamber 10, provides the aluminum or chromium for diffusion into the surface of the component 1. In the region of the cavity 2 in which the green compact layer 9 is provided on the surface of the component 1, an aluminide or chromide layer is formed, comprising the corresponding metal components which have been arranged in the green compact layer. Accordingly, an alloyed aluminide or chromide layer forms on the surface of the cavity 2 of the component 1.

In the process presented, it is of course the case that not only the surface of the cavity 2, as shown in FIGS. 1 to 6, can be correspondingly treated, but also the outer surfaces of the component 1. However, the process according to the invention is suitable in particular for the surface treatment of cavities, and therefore the illustration has been limited to the cavity. However, it is self-evident that the component 1 can also be treated on the outer sides in accordance with the process. In addition, it is also possible to treat the outer sides of the component 1 which are directly accessible with other suitable processes.

During the production of the green compact layer 9, a heat treatment step can be carried out between individual substeps, i.e. the deposition of a binder layer and a metal particle layer, and/or after the deposition of the last metal particles, which heat treatment step is used for drying and/or volatilizing the binder and which can have the effect that the metal particles are present as a porous green compact layer in the manner of a sintered body on the surface of the component 1.

In the process according to the invention, different metal particle powders which differ, for example, in the size of the metal particles and/or the composition of the metal particles can be used in the respective substeps for repeatedly applying metal particles, and therefore a graduated aluminide or chromide layer can be applied.

In addition, it is self-evident that the metal powder 7 can comprise different metal particles, where in this case, too, the metal particles can differ in size and/or chemical composition, and therefore multiple-alloyed aluminide or chromide layers can be produced.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed is:

1. A process for producing an aluminide layer or a chromide layer on a component by alitizing or chromizing, wherein the process comprises depositing a green compact layer of a binder and metal particles for forming an aluminide layer or a chromide layer on the component and thereafter carrying out alitizing or chromizing, the binder and the metal particles being deposited on the component separately from one another by first applying the binder by dip coating to form a binder layer, and then depositing the metal particles on or in the binder layer by dusting or embedding the component in a powder bed of the metal particles, applying binder and depositing metal particles being carried out two or more times.

2. The process of claim 1, wherein the green compact layer is subjected to a heat treatment after the last metal particles have been applied.

3. The process of claim 1, wherein the green compact layer is subjected to a heat treatment after each time binder has been applied and metal particles have been deposited thereafter.

4. The process of claim 1, wherein the green compact layer is subjected to a heat treatment after applying binder and depositing metal particles has been repeated two or more times.

5. The process of claim 1, wherein the component comprises at least one of a cavity and an undercut.

6. The process of claim 5, wherein the binder is applied by introducing the binder into a cavity and the metal particles are deposited by introducing a powder of the metal particles to be deposited into the cavity.

7. The process of claim 1, wherein the deposited green compact layer has a thickness of from 0 μm to 150μm.

8. The process of claim 1, wherein each sublayer produced by applying binder and depositing metal particles two or more times has a thickness of from 3 μm to 5 μm.

9. The process of claim 1, wherein a graduated green compact layer is deposited by using a different metal powder when repeating a deposition of metal powder.

10. The process of claim 1, wherein the metal particles comprise two or more types of particles which differ from each other in terms of chemical composition.

11. The process of claim 1, wherein the component is a turbine component for a gas turbine.

12. The process of claim 1, wherein the component is a turbine component for an aero engine.

13. The process of claim 1, wherein the turbine component is a turbine blade or vane.

14. A turbine component comprising at least one cavity, wherein a chromide layer has been formed on a surface of the turbine component in the cavity by the method of claim 1.

15. The turbine component of claim 14, wherein the turbine component is a turbine blade or vane.

16. The turbine component of claim 15, wherein the turbine blade or vane comprises one or more cooling passages.

17. The turbine component of claim 14, wherein a graduated chromide layer has been formed on a surface of the turbine component in the cavity.

18. The turbine component of claim 17, wherein the turbine component is a turbine blade or vane.

19. A turbine component comprising at least one cavity, wherein a graduated aluminide layer has been formed on a surface of the turbine component in the cavity by the method of claim 1.

20. The turbine component of claim 19, wherein the turbine component is a turbine blade or vane.

* * * * *